E. K. HARRIS.
TROLLEY WHEEL.
APPLICATION FILED MAY 26, 1909.
976,172.
Patented Nov. 22, 1910.
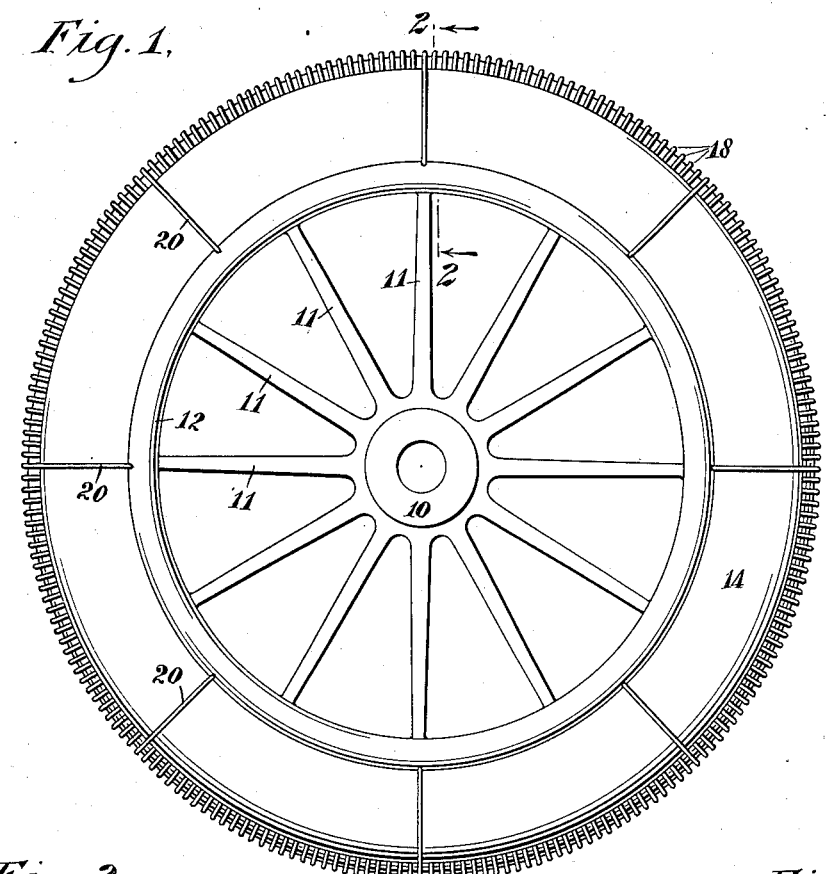
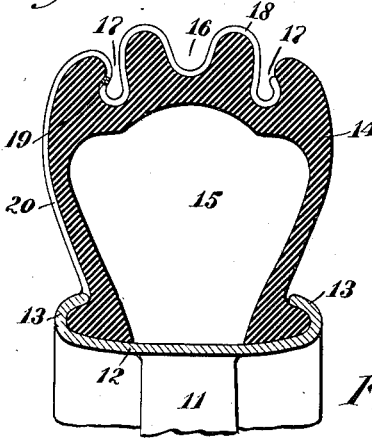
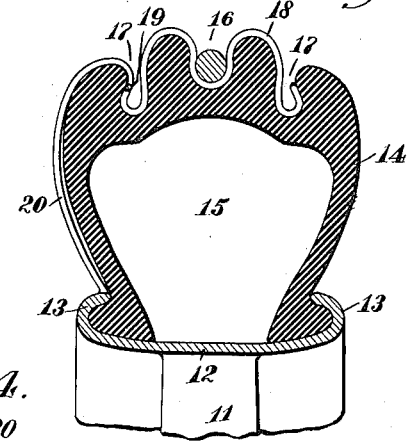
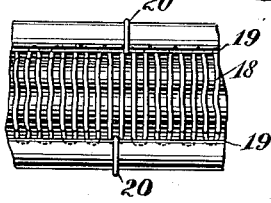
WITNESSES
Edward Thorpe
C. W. Fairbank
INVENTOR
Edward K. Harris
BY
ATTORNEYS

UNITED STATES PATENT OFFICE.

EDWARD K. HARRIS, OF CANANDAIGUA, NEW YORK.

TROLLEY-WHEEL.

976,172.  Specification of Letters Patent.  Patented Nov. 22, 1910.

Application filed May 26, 1909. Serial No. 498,399.

*To all whom it may concern:*

Be it known that I, EDWARD K. HARRIS, a citizen of the United States, and a resident of Canandaigua, in the county of Ontario and State of New York, have invented a new and Improved Trolley-Wheel, of which the following is a full, clear, and exact description.

This invention relates to certain improvements in trolley wheels, and more particularly to a trolley wheel adapted for use in a system for communication between a moving train and a station or another moving train.

The special features of my trolley wheel are such that a greater portion of the wheel touches the trolley wire than in ordinary metal trolley wheels, and the wheel is formed of such material as to allow the wire to give a uniform contact irrespective of irregularities or projections along the length of the wire.

Reference is to be had to the accompanying drawings forming a part of this specification, in which similar characters of reference indicate corresponding parts in all the views, and in which—

Figure 1 is a side elevation of a wheel constructed in accordance with my invention; Fig. 2 is a transverse section on the line 2—2 of Fig. 1; Fig. 3 is a view similar to Fig. 2 but showing the wheel in contact with a trolley wire; and Fig. 4 is a view of the portion of the outer or peripheral surface of the wheel.

The body of my improved wheel may be formed in any suitable manner, either as a solid casting or made up of a series of parts, as may be found most desirable in practice. In the specific form illustrated I employ a hub 10 with a central passage therethrough to adapt it for mounting upon a suitable spindle or axle carried by the trolley pole. This hub 10 is connected by a series of spokes 11 to a rim 12, which latter preferably has outwardly extending flanges 13, 13 to form a peripheral groove or channel in the rim. The hub, spokes and rim may be conveniently cast as a single piece of metal.

The rim 12 carries a tire 14, preferably of rubber, and having a central passage or chamber 15. Certain of the general features of this tire and the rim may be constructed very similar to the common form of pneumatic tire with clencher rims employed upon vehicle wheels, but of course the trolley wheel is constructed upon a greatly reduced scale. The tire may be filled with compressed air or any suitable substance so as to normally hold the outer portion of the tire distended, but permit of a limited radial movement in respect to the rim.

The rim is provided with a central peripheral groove 16 adapted to receive the trolley wire, and is preferably provided with two grooves 17, 17 upon opposite sides thereof and substantially parallel thereto, for the purpose hereinafter set forth.

As the tire is a non-conductor of electricity, the periphery of the tire is provided with a metallic covering or facing by means of which the current may be conducted from the trolley wire to the rim and thence down the trolley pole to the car. This covering is preferably in the form of a wire 18 of copper or other similar material and extended back and forth across the periphery of the tire. The wire is bent so as to fit down into the three grooves or corrugations, 16, 17, 17, and as each transverse run of the wire is connected to the next transverse run only at its ends, it is evident that this wire facing is freely flexible with the surface of the tire. Within the two outer grooves 17, 17 are preferably two side wires 19, 19 connecting together all of the transverse runs of the wire 18, and holding them in place. These side wires 19, 19 lie within the two grooves 17, 17, and as they are of a smaller diameter than the portions of the tire just outside of these grooves 17, 17 they serve to hold the wire casing in place and positively prevent its detachment or disengagement from the tire.

One or both of the side wires 19 may be connected to the rim by radially disposed wires 20, which not only aid in holding the wire casing or facing in place, but also serve to conduct the electricity from the cross wires 18 to the rim 12.

As previously stated, the central groove 16 serves to receive the trolley wire. The material of the tire is, of course, thinner opposite the three grooves 16, 17, 17 than it is at the portions intermediate these grooves, and therefore a pressure of the trolley wire radially of the wheel will tend to bend the tire along the central groove to bring the portion of the tire on opposite sides to these grooves toward each other, as illustrated in Fig. 3. This movement of the portions of the tire tends to grip the trolley wire upon opposite sides so that the contact between the trolley wire and the wire 18 will extend throughout approximately one-half of the circumference or outer surface of the adjacent portion of the trolley wire. The side grooves 17, 17 serve not only for the reception of the ends of the transverse wire 18 and the circumferential wires 19, but they also permit the tire to bend along the lines of the grooves, so that the portions or ridges between these two side grooves and the center groove 16, will tend to swing toward the central groove to effect the gripping action before referred to.

Various changes may be made in the construction of my improved trolley wheel within the scope of my invention as defined by the claims, as the particular form illustrated involves only one embodiment of my invention.

Having thus described my invention, I claim as new and desire to secure by Letters Patent:

1. A trolley wheel having a rim, and a resilient tire of non-conducting material carried thereby and having a peripheral groove adapted to receive a trolley wire and conducting means lying along said groove.

2. A trolley wheel having a peripheral tire of non-conducting resilient material, and provided with two peripheral ridges or flanges separated by a peripheral groove and conducting means carried thereby.

3. A trolley wheel having a peripheral tire formed of rubber and provided with a peripheral groove adapted to receive a trolley wire, said tire having a metallic facing within said groove and electrically connected to the rim of the wheel.

4. A trolley wheel having a rim, a hollow rubber tire carried thereby and having three peripheral grooves, one of which is adapted to receive a trolley wire and the other two of which facilitate the movement of the intermediate portions of the tire toward the trolley wire to grip the latter and conducting means within the first-mentioned groove.

5. A trolley wheel having a rim, a resilient tire of non-conducting material, and a facing for said tire and formed of a plurality of transversely-extending wires connected together and connected to said rim.

6. A trolley wheel having a resilient tire of non-conducting material, provided with three circumferential grooves, one of which serves to receive the trolley wire, a plurality of transverse wires extending across said grooves, and connecting wires in the two outer grooves for holding said transverse wires in place.

7. A trolley wheel having a resilient tire of non-conducting material, provided with three circumferential grooves, one of which serves to receive the trolley wire, a plurality of transverse wires extending across said grooves, connecting wires in the two outer grooves for holding said transverse wires in place, and electric connections between said connecting wires and the rim of the wheel.

8. A trolley wheel having a peripheral tire of non-conducting resilient material, and a facing upon said tire formed of a plurality of wires electrically connected to the rim of the wheel.

9. A trolley wheel having a peripheral tire formed of resilient non-conducting material and provided with a peripheral groove adapted to receive a trolley wire, said tire having a metallic facing within said groove and electrically connected with the body of the wheel.

In testimony whereof I have signed my name to this specification in the presence of two subscribing witnesses.

EDWARD K. HARRIS.

Witnesses:
CHARLES M. BROWN,
H. G. HARRIS.